United States Patent [19]
Horne et al.

[11] 3,763,896
[45] Oct. 9, 1973

[54] PLUGGING A HOME SERVICE SEWER LINE

[75] Inventors: Frederick F. Horne, Carmel Valley; Gerald G. Vanderlans, Lodi, both of Calif.

[73] Assignee: Airrigation Engineering Company, Inc., Carmel Valley, Calif.

[22] Filed: Jan. 7, 1972

[21] Appl. No.: 216,171

[52] U.S. Cl............. 138/89, 166/202, 15/104.06 R
[51] Int. Cl............................................ F16l 55/10
[58] Field of Search .................. 138/94, 89, 90, 92, 138/95; 166/202; 73/40.5, 46, 49.1, 49.8; 15/104.06 R

[56] References Cited
UNITED STATES PATENTS

| | | | |
|---|---|---|---|
| 2,818,086 | 12/1957 | Foth...................................... | 138/89 |
| 2,067,499 | 1/1937 | Millmine.............................. | 73/46 X |
| 2,588,188 | 3/1952 | Weisman .............................. | 138/89 |

*Primary Examiner*—George E. Lowrance
*Assistant Examiner*—Steven M. Pollard
*Attorney*—Robert E. Wickersham

[57] ABSTRACT

A system for applying an aqueous chemical solution to a home-service sewer line. A special elastomeric plug is used on the end of a flexible cable. This plug has a stiff radial portion smaller than the smallest pipe-line used in the home service line, a cylindrical portion having a diameter substantially equal to that of the largest pipe in the home service line, and a frustoconical portion connecting the two other portions. During insertion the flexible cable is rotated as it is inserted. Preferably, a semi-stiff metal rod or springy cable extends forward of the plug and is secured to the end of the flexible cable, to help the plug to turn corners of elbows and follow curves. If the home service line should have a smaller pipe succeeded by a larger pipe, the plug collapses inside the smaller pipe for passage through it and then resumes its normal shape in the larger pipe. When liquid is supplied at the house clean-out, the cylindrical portion of the plug expands and forms a tight seal against the pipe, enabling soak treatment by the chemical. Then, by pulling on the flexible cable, the plug can be pulled inside out, so that the liquid drains, and the plug can then be retracted.

5 Claims, 7 Drawing Figures

PATENTED OCT 9 1973 3,763,896

PLUGGING A HOME SERVICE SEWER LINE

BACKGROUND OF THE INVENTION

This invention relates to a system for plugging a home sewer service line for treatment by a liquid chemical or solution.

Plant roots have caused considerable problems in sewer and also in home service lines leading to the sewers. In earlier patent applications I have described methods, apparatus, and compositions of matter for eliminating plant roots from sewers. Those inventions may apply to home service lines, except for the following special problems that have occurred there:

1. In home service lines it is not practical to insert a flexible cable with plug at a house cleanout and to withdraw the cable at some other place; the cable and any plug thereon have to be taken out at the same place where they were put in.
2. Home service lines often have elbows through which most plugs cannot be forced.
3. Home service sewer lines also are often made up of a 4-inch pipe followed by a 6-inch pipe, and when that is true, the plug has to be able to pass first through the 4-inch pipe without difficulty and then to be able to seal against the walls of the 6-inch pipe. The plugs which have been available heretofore for use in a straight line have not been able to do this.
4. Even when the entire home service line is constant in diameter, plugs that have been easily installed have not been able to seal properly, and those which have sealed properly have not been easily installed or removed.
5. It is often necessary for the plug to hold a substantial head of water, since the flow is by gravity. In instances where the clean-out is at a substantially greater altitude than the sewer, the head may be considerable. Yet the chemical treatment requires holding the aqueous solution in the system for several minutes. Then, it must be possible to release the solution and withdraw the plug back through the pipe and to remove it from the clean-out.

It is thus an object of the invention to provide a plug which can be inserted readily through a 4-inch pipe and yet will seal in a 6-inch pipe, and which can be released easily and can be withdrawn readily.

SUMMARY OF THE INVENTION

The invention comprises an elastomeric plug secured to the end of a flexible cable, usually with a semi-stiff metal lead rod or spring-like cable secured ahead of the plug. The plug itself has three major portions, all integral: a radial portion, a frustoconical portion, and a cylindrical portion. The radial portion is of smaller diameter than the smallest pipe through which the plug is to pass. Thus if the smallest pipe is a 4-inch pipe, the radial portion may well be about 1 and ½ inches in diameter. The cylindrical portion is substantially the exact inside diameter of the largest pipe in which the plug is to be used. Thus, for example, if the plug is to be used in a 4-inch pipe, the cylindrical portion should be 4 inches in diameter, while if the plug is to be used in a 6-inch pipe the cylindrical portion should be 6 inches in diameter. The frustoconical portion connects the two together.

The requirements are not completely satisfied, however, by an elastomeric plug having the shape and size relation so far described. Such a plug will not actually be able to go through a smaller pipe unless it is sufficiently flexible nor will it be able to hold a head unless it is sufficiently stiff and strong. If the frustoconical portion and the cylindrical portion are the same stiffness and thickness, difficulty is experienced in retracting the plug, and if the radial portion is not stiffer than the other two portions there are additional difficulties in installing and retracting the plug and in having it hold its shape properly while installed; thus weakness in this radial portion may cause the cable to pull loose or may cause a collapse of the plug while it is under the hydraulic head, due to the pressure against it.

Consequently, the invention calls for the radial portion to be reinforced, preferably in two ways. A central disc of fabric may be bonded inside the elastomer and may extend not only to the radial portion but somewhat beyond it into the frustoconical portion so as to strengthen and to stiffen the area where the frustoconical portion meets the radial portion. In addition, it is preferred to bond metal washers to each face of the radial portion. At the center of the radial portion is an opening for securing the plug to the cable and lead rod, usually with the aid of threads and nuts.

The frustoconical portion is thinner and more flexible than either the radial portion or the cylindrical portion, and the cylindrical portion is thickened with respect to the frustoconical portion, preferably by an inserted cylindrical laminate of relatively softer elastomer, which helps it to collapse adequately but yet gives it the added thickness when the stiffness is needed, and outward stability so that it will expand and fit the inside diameter of the pipe.

Other objects and advantages of the invention will appear from the following description of a preferred embodiment.

BRIEF DESCRIPTION OF THE DRAWINGS

In the drawings:

FIG. 5 is a view similar to FIG. 3, showing the assembly installed and before the solution is put in.

DESCRIPTION OF A PREFERRED EMBODIMENT

Figure 1:
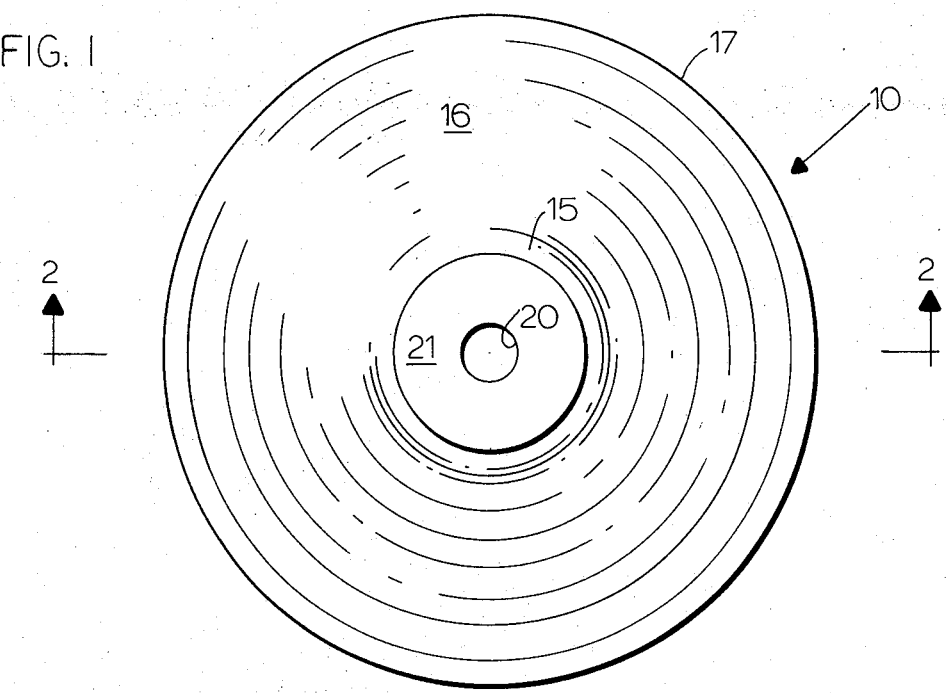
FIG. 1 is a view in end elevation of a plug embodying the principles of the invention.
Figure 2:
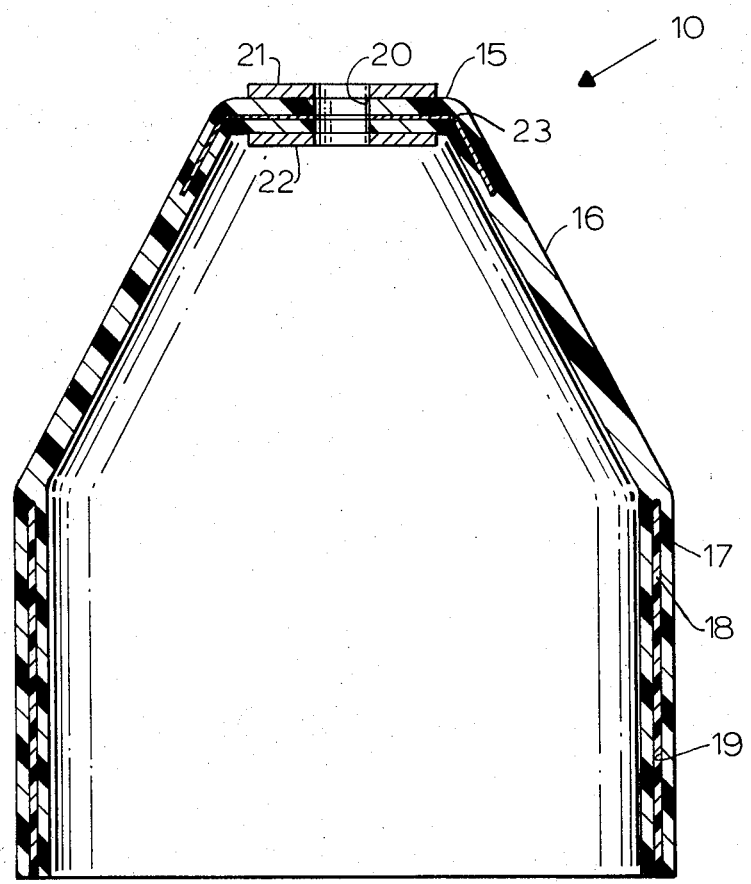
FIG. 2 is a view in section taken along the line 2—2 in FIG. 1.

The invention comprises a novel plug 10, a flexible cable 11 and in many, if not most, instances a lead rod 12. The flexible cable 11 is well known in plumbing work, and the lead rod 12 may comprise a semi-stiff metal rod or springy cable, typically about 18 inches long, although it may be longer or shorter, secured to the end of the cable 11 and thereby to the plug 10, which is also secured to the end of the cable 11. The distal end of the rod 12 preferably has a hook-like or angled end 13, to help flip the end of the rod 12 away from obstructions, such as joints in the pipe, since the cable 11 is being rotated as it is inserted.

The plug 10 is novel and comprises a radial portion 15, a frustoconical portion 16 and a cylindrical portion 17. The frustoconical portion 16 is the thinnest of the three portions, the cylindrical portion 17 being thickened by the addition of an interior lamination 18 of sleeve shape provided in a recess 19. This not only thickens the portion 17; it also makes it a little stiffer than the frustoconical portion 16 and enables the portion 17 to have both the needed thickness and the flexibility enabling it to collapse adequately, an important point.

The radial portion 15 is substantially smaller in diameter than the smallest pipe into which the plug 10 is to be inserted. When the plug 10 is to be used with a combination of 4-inch and 6-inch pipes, the radial portion 15 may be about 1 and ½ inches or 2 inches in diameter, for example. It has a central opening 20 to enable its attachment to the cable 11 or the rod 12, or both. Metal washers 21 and 22 are bonded to the two surfaces of the radial portion 15 and are somewhat smaller in diameter, to enable better flexing beyond them when the plug 10 is pulled inside out. The radial portion 15 is also strengthened, as is a short portion of the frustoconical portion 16 adjacent to the radial portion 15, by the addition of a fabric washer 23 bonded preferably midway between the two surfaces. This washer 23 enables the plug 10 to flex when the plug 10 is turned inside out and enables this reversal to be accomplished without tearing the plug 10.

The plug 10 is stiffest at the radial portion 15 and is most flexible at the frustoconical portion 16. The cylindrical portion 17 is substantially equal to the inside diameter of the largest pipe with which the particular plug 10 is to be used, and it is important for it to be made in a dimension closely approaching that. Thus, for a 4-inch pipe which is really 4 inches in inside diameter, the cylindrical portion 17 should be 4 inches. If the pipe is actually 3 and ¾ inches in diameter, this cylindrical portion 17 should be 3 and ¾ inches in diameter. There are some tolerances, but it should not be a completely different dimension, and if there are different dimensions in use, which there usually are not, the plumber should carry such a variety as will be needed. For a 6-inch pipe, the cylindrical portion should be 6 inches in diameter, if that is the inside diameter of the pipe, or whatever the inside diameter of the pipe is.

Figure 3:
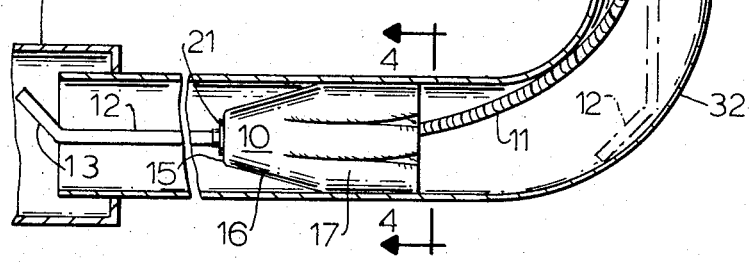
FIG. 3 is a diagrammatic illustration of a house service line, with breaks indicating omissions of portions of substantial length, in which is being inserted apparatus embodying the principles of the invention. One position of the apparatus is shown in solid lines, while an earlier position is shown in dot-dash lines.

As shown in FIG. 3, when the assembly is inserted into a pipe 30 at a clean-out 31 and pushed in while turning the cable 11 around and around, the lead rod 12 helps to guide the plug 10 around an elbow 32 or other curves or corners, whereas otherwise the plug 10 would tend to get wedged at the corner and not make the turn properly. The angle 13 on the lead rod 12 helps to guide the turning cable 11, since it flips out of cracks; otherwise the cable 11 would have to force the end 13 out of hang-ups, and thereby hamper the guiding of the plug 10. By contacting the walls of the pipe 30 the rod 12 helps to push the plug 10 toward one side of the pipe 30 and away from the other side of the pipe 30 during these turns. At other times it does not matter. The broken-line position is before the plug 10 reaches the curve 32, and the solid-line position comes afterwards.

Figure 4:
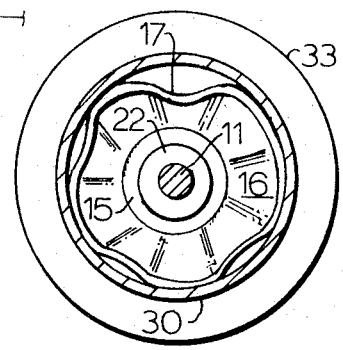
FIG. 4 is a view in section taken along the line 4—4 in FIG. 3.

As shown in FIG. 4, the plug 10, when inserted through a 4-inch pipe 30, (supposing the plug 10 here to be made for a 6-inch pipe 33) collapses readily so that it can pass through very easily. This is quite important and is a problem which previous plugs did not solve; nothing existing was found that could do this adequately.

Figure 5:
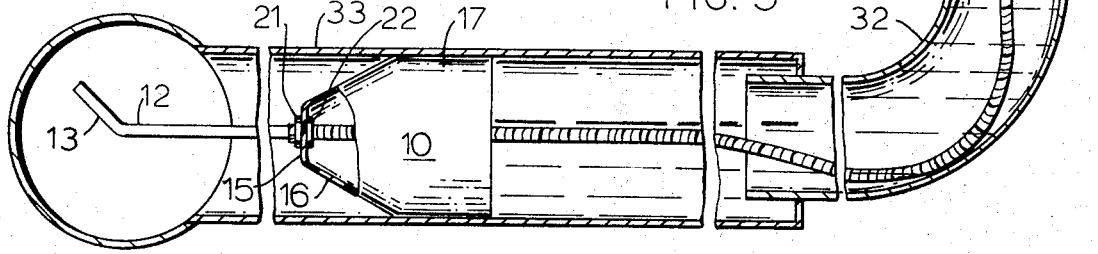

Once the plug 10 has passed through the 4-inch pipe 30 and entered the 6-inch pipe 33 as shown in FIG. 5, it expands and can come against the wall. It will tend to do this naturally due to its flexibility and outward elasticity, and if it does not do it at the moment it will do it as soon as water or other liquid is put in.

Figure 6:
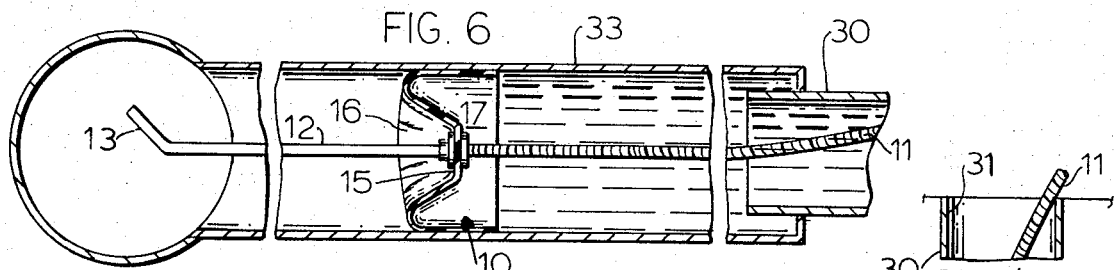
FIG. 6 is a view like FIG. 3 with the device fully in place holding the solution.

As the liquid is put in, the hydraulic pressure helps the cylindrical portion 17 engage the pipe wall snugly and to seal against passage of liquid there. Considerable pressure can be built up behind the plug 10. This pressure can also and does, when there is a head, force the plug into the shape shown in FIG. 6, where the cylindrical portion 15 moves forward and the frustoconical portion 16 is distorted into a bowed-out shape which helps to press the cylindrical portion 15 snugly against the pipe.

Figure 7:
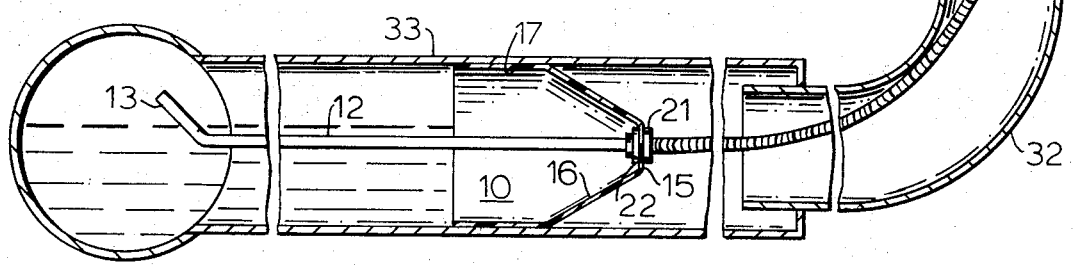
FIG. 7 is a view like FIG. 3 of the plug fully reversed in order to retract it.

In this condition, the head is held until the treatment is completed. When the treatment is completed and it is desired to withdraw the apparatus, this is very simply done by pulling stoutly on the cable 11, either mechanically or by hand and then retracting the cable 11. The first thing that happens is that the pull exerted on the cable 11 acts on the radial portion 15 to pull it through the cylindrical portion 17, thereby reversing the plug 10 to the shape shown in FIG. 7, at which time the liquid readily passes around it, draining out and relieving the hydrostatic pressure, forcing the portion 17 inwardly. Then the plug 10 can be pulled back into the 4-inch pipe 30, where it collapses again to substantially the same shape as it had in FIG. 4, and finally the cable 11 is retracted the remaining distance.

To those skilled in the art to which this invention relates, many changes in construction and widely differing embodiments and applications of the invention will suggest themselves without departing from the spirit and scope of the invention. For example, the portion 16 referred to as frustoconical could have a functionally equivalent shape, such as a spherical segment or a bellows-like or convoluted portion. As another example, the cylindrical portion 17 could have a thinner rear edge. Again, the central disc 23 could be replaced by a layer of random fibers or a molded plastic grid of material such as polytetrafluoroethylene. The disclosures and the description herein are purely illustrative and are not intended to be in any sense limiting.

We claim:

1. An apparatus for temporarily plugging a home service line having a clean-out and connected to a main sewer or tank, so as to enable chemical treatment of the home service line, including in combination:

a flexible cable, an elastomeric plug having 1. a radial portion secured to the end of said cable, said radial portion being substantially smaller in diameter than the smallest pipe in the home service line, said radial portion being stiff and vulcanized to a metal washer, 2. a more flexible frustoconical portion of elastomer continuing from the outer periphery of said radial portion and continuous therewith, and 3. a thicker cylindrical portion of substantially the same diameter as the largest pipe in the home service line, being integral with said frustoconical portion and stiffer than it, and a semi-stiff metal lead rod secured to the end of said cable at said plug and extending forward therefrom, whereby said assembly is inserted at said house cleanout, with said lead rod preceeding said plug and enabling the plug to pass through pipe elbows, said plug collapsing for passage through small diameter pipe if there is any, and expanding readily in the larger-diameter pipe, so that when aqueous solution is supplied to said home service line through said clean out, said cylindrical portion of said plug is moved snugly against the wall of the home service line to seal it off and hold a substantial head of water backing up as far as said cleanout, and when treatment is completed, said plug can be pulled by said cable to pull the radial portion through said cylindrical portion, turning the plug inside out and letting the solution flow past it into said sewer or tank and enabling retraction of the plug and rod by the cable.

2. The apparatus of claim 1 wherein said radial portion is bonded between two metal washers that are rigid and are somewhat smaller in diameter than said radial portion, and said radial portion has a fabric washer vulcanized therein and extending into a small portion of said frustoconical portion.

3. The apparatus of claim 1 wherein said cylindrical portion is laminated with flexible elastomer.

4. An apparatus for plugging a home service line of the type having a small-diameter pipe leading from a house cleanout and connected to a larger-diameter pipe that leads to a main sewer or the like, so as to enable chemical treatment of the two pipes, including in combination:

a flexible cable, an elastomeric plug having 1. a radial portion secured to the end of said cable, said radial portion being smaller in diameter than said small-diameter pipe and including a central fabric stiffener vulcanized inside the elastomer and a pair of metal washers, smaller in diameter than said radial portion, vulcanized to opposite surfaces of said elastomer, 2. a frustoconical portion of elastomer continuing from the outer periphery of said radial portion and continuous therewith, a short portion thereof including an outer portion of said fabric stiffener, and 3. a laminated thicker cylindrical portion having a diameter identical to that of said large-diameter pipe and integral with said frustoconical portion and having a flexible elastomer laminated therewith, and a semi-stiff metal rod secured to the end of said cable at said plug and extending forward therefrom, whereby said assembly is inserted in said small-diameter pipe at said house cleanout, with said rod preceeding said plug and enabling the plug to pass through pipe elbows, said plug collapsing for passage through said small-diameter pipe and expanding readily in said large-diameter pipe, so that when aqueous solution is supplied to said small-diameter pipe said cylindrical portion of said plug is moved snugly against the walls of the large-diameter pipe to seal it off and hold a substantial head of water backing up to and in said small-diameter pipe as far as said cleanout, and when treatment is completed, said plug is pulled by said cable to pull the radial portion through said cylindrical portion, turning the plug inside out and letting the solution flow past it into said sewer and enabling retraction of the plug and rod by the cable.

5. An elastomeric plug for attachment to a flexible cable, for plugging a home service line, comprising 1. a radial portion adapted to be secured to the end of said cable, said radial portion including a central fabric stiffener vulcanized inside the elastomer and a pair of metal washers smaller in diameter than said radial portion vulcanized to opposite surfaces of said elastomer, 2. a frustoconical portion of elastomer continuing from the outer periphery of said radial portion and continuous therewith, a short portion thereof including an outer portion of said fabric stiffener, and 3. a laminated thicker cylindrical portion integral with said frustoconical portion and having a flexible elastomer laminated therewith.

* * * * *